Apr. 24, 1923. 1,453,034

H. B. WALLACE

METHOD OF VULCANIZING TIRES

Filed Dec. 15, 1920

Inventor:-
Harry B. Wallace
By Hugh K. Wagner,
Att'y.

Patented Apr. 24, 1923.

1,453,034

UNITED STATES PATENT OFFICE.

HARRY B. WALLACE, OF ST. LOUIS, MISSOURI.

METHOD OF VULCANIZING TIRES.

Application filed December 15, 1920. Serial No. 430,948.

*To all whom it may concern:*

Be it known that I, HARRY B. WALLACE, a citizen of the United States, residing at the city of St. Louis, in the State of Missouri, have invented certain new and useful Improvements in Methods of Vulcanizing Tires, of which the following is a specification.

This invention relates to the method of curing tires, particularly cord tires, when an airbag is used as a form on which such curing or vulcanization takes place.

In the accompanying drawings forming part of this specification, in which like numbers of reference denote like parts wherever they occur, Figure 1 is a side elevation of the bead-setting rings (commonly called bull-rings);

Figure 1:
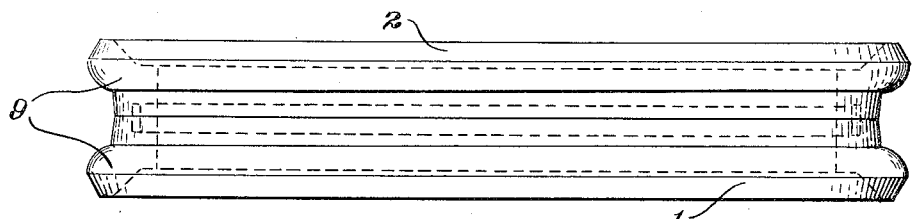
Figure 2:
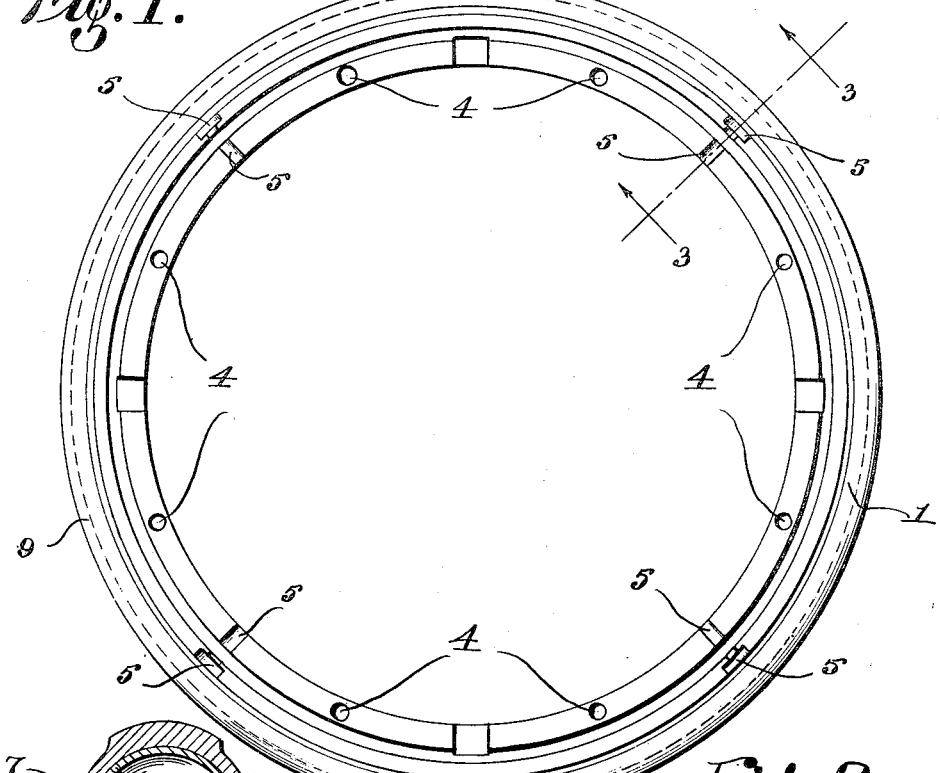
Figure 2 is a top plan view of the lower ring in Figure 1.
Figure 3:
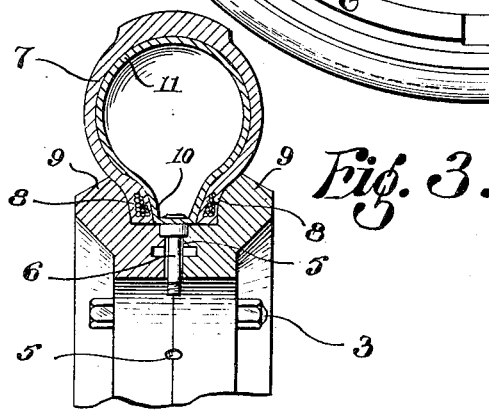
Figure 3 is a sectional view on the line 3—3 in Figure 2, with a sectional view of a tire and its inclosed airbag added thereto.

It has been customary to place an airbag within an uncured tire, then to put the tire, containing such airbag, in a mold for vulcanization, then more or less to inflate such bag, and then to place the same in the oven.

In practice, it has been found that this results in great losses, due to imperfections thereby produced in the airbags and, more especially, due to the production of numerous worthless or imperfect tires.

These defects are caused by the buckling or kinking of the airbag within the tire when placed therein. Such bags are made as large as, if not a trifle larger than, the inside capacity of the tire. This results in the wrinkling or buckling of the bag when placed in the tire. This size is necessary in order that the airbag used as a form may impart full distention to the tire. Due to the pressure of the mold from the outside, such wrinkle or buckle frequently does not stretch or straighten out when compressed air is admitted, with the result that the kink thus formed in the airbag remains in it during vulcanization of the tire and its form is imparted to the tire, which constitutes an imperfection in the tire, which imperfection is made permanent in the tire by vulcanization.

The tire is composed primarily of rubber in an unvulcanized condition (with such cord or other textile material or the like imbedded therein as is common), and before the airbag is placed therein the tire is substantially perfect. If not absolutely perfect, it is in such a condition that vulcanization under proper conditions will remove its imperfections, and it is, therefore, with the exception of vulcanization, commercially complete, and, for that reason, represents a considerable investment for material, labor, and other manufacturing and commercial factors. If, because of the wrinkling or buckling of the airbag as mentioned above, the tire emerges from its vulcanization in a condition unfit for use or with an imperfection that reduces it to a grade that is known as "seconds" the loss to the tire-manufacturer is very great. Moreover, when a wrinkled or buckled airbag is subjected to the heat of vulcanization, it is permanently injured and its life shortened, and, in many instances, it is completely ruined.

The cost of airbags for forms for the purpose above stated is very considerable, and the increase of their life, i. e., the number of times on the average that they can be used, is a material factor in the decrease of the cost of the manufacture of tires. It has been found that the older an airbag is the greater the likelihood of its buckling as above stated. For this reason, some manufacturers have felt driven to throw away good airbags for fear that, on account of age, they may buckle and spoil tires.

The danger of buckling by an airbag is increased after it has been used only a few times, as in use it is stretched and does not contract or return to its original size. The oftener it has been used the greater is this danger.

This improved process to overcome the above-mentioned difficulty is after inserting the air bag within the tire to place the bead-setting rings (commonly called bull rings) upon the casing and to lock them together securely. This tightly locks and secures the tire and airbags together, especially airbags the beads of which contain wire or steel. Then, upon the injection of pressure into the airbag, the casing or tire, consisting of green or uncured stock, is easily expanded so that any wrinkle or buckle is stretched or straightened out in the airbag. After the tire has been properly stretched and the airbag forced into its proper place, the internal pressure in the airbag can be reduced or released, if necessary, when placing the tire in the mold in which it is to be vulcanized, so that it will take its proper position. After the mold has been fastened together internal pressure is put into the airbag, so as to secure the full and proper internal pressure during the process of vulcanization.

In this way not only are more perfect tires produced and greater service secured from airbags, but great economy is accomplished, because of the elimination of imperfect or "seconds" tires and buckled or damaged airbags.

The bead-setting rings 1 and 2 are mates, and are adapted to be bolted together tightly by bolts 3, which pass through holes 4. A space or groove 5 is provided in which the air valve 6 can lie when the rings 1 and 2 are bolted together. There is such a groove 5 in each ring 1 and 2.

The tire 7 is so gripped at its beads 8 between the edges of flanges 9 of rings 1 and 2 and the wedge 10 of airbag 11 that it is tightly held there, besides encircling rings 1 and 2, while it is allowed to expand elsewhere while fluid pressure (either gaseous or liquid) is admitted into bag 10, through valve 6. As above stated this unfailingly takes the kinks out of bag 10.

Having thus described this invention, I hereby reserve the benefit of all changes in form, arrangement, order, or use of part, as it is evident that many minor changes may be made therein without departing from the spirit of this invention or the scope of the following claims.

I claim:

1. A method of preparing a tire-casing for vulcanizing upon an inflatable bag as a form, which method consists in distending the bag and the casing by the application of pressure internally of the bag until the bag is fully distended and free of wrinkles, reducing the pressure as required to accommodate the tire in a mould in which it is to be vulcanized so that it will take its proper position therein, and subsequently increasing the internal pressure of the air bag, after the mould has been fastened together, so as receive the full and proper internal pressure during the process of vulcanization.

2. The method of preparing a tire-casing for vulcanization upon an inflatable bag as a form, which consists in inserting the bag within the casing and locking the two securely together, inflating the bag and casing by internal pressure introduced into the bag previous to and subsequent to confining the two in the mould in which vulcanized, and reducing the pressure between periods of inflation to accommodate the tire to the mould.

In testimony whereof I hereunto affix my signature.

HARRY B. WALLACE.